…

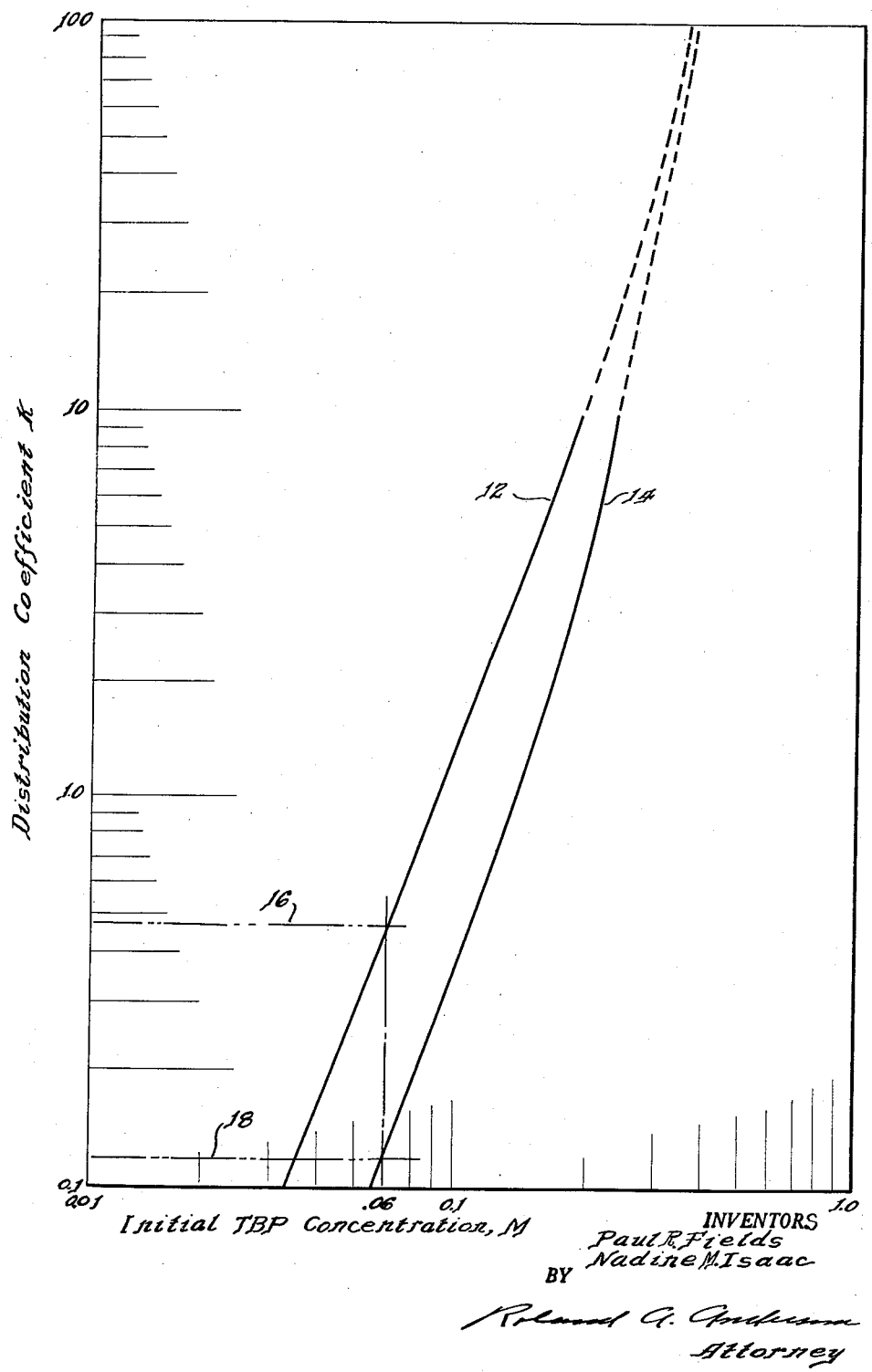

United States Patent Office 3,022,134
Patented Feb. 20, 1962

3,022,134
SEPARATION OF CURIUM AND AMERICIUM
Paul R. Fields, Chicago, Ill., and Nadine M. Isaac, Brussels, Belgium, assignors to the United States of America as represented by the United States Atomic Energy Commission
Filed Aug. 31, 1960, Ser. No. 53,323
7 Claims. (Cl. 23—14.5)

This invention relates to a process for the extraction of curium from an anhydrous fused salt bath containing both americium and curium by contacting the molten salt with a dilute organic solvent at about 150° C.

Among the transuranium products resulting from the bombardment of $U^{238}$ with neutrons in a nuclear reactor are americium and curium. Americium is present in two isotopic forms: $Am^{241}$ which is capable of absorbing a neutron, and the resultant $Am^{242}$ which has a half-life of 16 hours. The $Am^{242}$ isotope decays by beta emission to give $Cm^{242}$. Since $Cm^{242}$ has a relatively long half-life of 162 days as an alpha emitter, it is valuable as a power source such as those under development for use in satellites.

Another isotope, $Cm^{245}$, is a potential fuel for use in neutronic reactors since it is thermo-neutron-fissionable.

It is an object of this invention to separate curium from americium.

It is also an object of this invention to separate curium from americium by extraction from a molten salt bath directly into an organic solvent.

It is an object of this invention to separate americium from curium contained in an organic phase by contacting the organic phase with a molten salt phase.

It is another object of this invention to separate curium from americium with a minimum number of extraction stages.

Still another object of this invention is to provide a process for the separation of curium from americium wherein the separation factor is much higher than that of any known process.

It was found that a diluted alkyl phosphate such as tributyl phosphate (TBP) in amounts less than 10 percent dissolved in a chemically inert organic diluent will preferentially extract curium from a low-temperature, anhydrous molten salt bath containing both curium and americium.

It is essential for the organic diluent to have a low melting point, a high boiling point, and resistance to the degrading effects of oxidation and radiation at high temperatures. Any diluent having the characteristics specified herein are satisfactory for the purposes of this invention. However, a diluent found to be well suited for this process is a eutectic mixture of polyphenyl aromatic hydrocarbons containing 25 percent by weight biphenyl, 55 percent ortho-terphenyl, and 20 percent meta-terphenyl. While these compounds are solid at room temperature, the eutectic melts at about 10.6° C., and has a boiling point of 298° C.

A fused salt with a low melting point is desirable since organic extractants in general begin to break down at temperatures above 100° C. Nitrate salts of monovalent metallic ions such as K, Na, and Li, and also Ba form eutectic mixtures with relatively low melting points. A mixture of 43 mole percent lithium nitrate and 57 mole percent potassium nitrate having a eutectic temperature of 120° C. is preferred in this process. This mixture has negligible affinity for TBP and is sufficiently fluid to permit extraction at a temperature of about 150° C.

The fused salt mixture is prepared by melting 43 mole percent lithium nitrate and 57 mole percent potassium nitrate at 350° C., then maintaining the molten mixture at 150° C. for a twenty-four hour period before use in order to eliminate any water of hydration.

It was found by earlier investigators that metal ions such as Fe III, Co II, Ni II, U VI, Pr III, and Nd III which were dissolved in a fuse $LiNO_3$—$KNO_3$ eutectic could be extracted essentially quantitatively by contacting the fused salt bath with undiluted TBP. We have found that the distribution coefficients of most metal ions between a fused salt bath and TBP are so high that even 10% TBP in the organic phase will almost completely extract all metal ions including Am and Cm from a molten salt without any indication of a satisfactory separation.

We have found by contacting such a fused salt bath as that described herein with an organic phase containing substantially less than 10% or 0.369 M TBP, namely with a TBP of a maximum concentration of 0.2 M, that instead of complete removal of both Am and Cm an unexpected selective extraction of curium is achieved. This selectivity is increased as the concentration of the TBP decreases. For example we found that the distribution coefficient for curium into the organic phase was as high as four times that for americium when the initial TBP concentration was limited to less than about 0.06 M in the organic phase.

At this low concentration of TBP, a more precise description of the TBP concentration may be made in terms of "free TBP." We have defined "free TBP" for the purposes of this invention as the concentration of uncomplexed TBP in the organic phase at equilibrium with the fused salt bath containing the ions to be extracted where $$TBP_{org.\ free} = TBP_{org.\ initial} - TBP_{org.\ complexed}$$

The $TBP_{org.\ complexed}$ was obtained by assuming that the number of TBP molecules associated with each complexed molecule in the organic phase was identical to that found in aqueous systems.

We have found that in an organic phase containing 10% TBP initially where the Li concentration was 9.5 M in the molten salt, the distribution coefficient for Li was 0.0048. Likewise, for a K concentration of 12.7 M in the molten salt, the distribution coefficient of K was on the order of $10^{-5}$. These distribution coefficients are small enough that even in the 10% TBP concentration, which is .369 M in TBP, these ions complexed only .09 mole of TBP. At .037 M initial TBP concentration, these ions complexed only .002 mole of TBP, since at this TBP concentration Li has a distribution coefficient of of $8.0 \times 10^{-5}$ while K has a distribution coefficient of $10^{-6}$. The proportion of TBP complexed by lithium and potassium ions is sufficiently small that for low concentrations of Am and Cm on the order of 0.01 M the process of this invention will be related to initial TBP concentration rather than to free, or uncomplexed TBP concentration. At higher and higher concentrations of Am and Cm more and more of the TBP will be complexed by these ions leaving less and less free TBP. Although this would not decrease the separation factor, there would be a loss of efficiency in the extraction after the free TBP had been complexed. This condition should be compensated for by adjusting the initial TBP concentration.

The drawing is a graph showing the log log relationship between distribution coefficients $Kd$ and initial TBP concentrations in moles. The data summarized here in graphical form was determined by experiments similar to that outlined in the example.

The line 12 in the drawing shows the relationship, between $Kd$ for curium and the initial TBP concentration. Line 14 shows a corresponding relationship for americium. At 0.06 M TBP concentration the intercept 16 gives $Kd_{Cm}$ and the intercept 18 gives $Kd_{Am}$.

The separation factor $$\frac{Kd_{Cm}}{Kd_{Am}}$$

for 0.06 M initial TBP concentration as shown in the drawing then is $$\frac{0.48}{0.12}$$

or 4.0.

Thus we achieved by the process of this invention an unexpectedly high separation factor. The best separation factor obtained to date for Am and Cm by other means was 1.45, which was obtained by an ion exchange method. Therefore, the separation of Cm and Am by the process of this invention is in the neighborhood of 360% better than any heretofore possible.

Due to the hazards involved in handling quantities of curium, the separation by the process of this invention can be demonstrated with tracer quantities of Am and Cm mixed with neodymium and europium as carriers.

*Example*

One milliliter of $LiNO_3$—$KNO_3$ eutectic anhydrous molten salt bath is made $10^{-2}$ molar in Nd and Eu anhydrous nitrate salts as stand-ins for Am and Cm respectively. Tracer amounts of anhydrous $Am^{241}$ and $Cm^{244}$ nitrates are added to the fused salt bath.

One milliliter of the TBP-organic phase which has been equilibrated with respect to the barren molten salt bath and which is 0.092 molar in initial TBP concentrations is heated to 150° C. and added to the fused salt bath. The salt phase and the organic phase are mixed by stirring while maintained at a temperature of 150° C. for a period of 2 to 3 minutes. The two phases are separated and cooled, then counted by an alpha counter and an alpha pulse analyzer to determine the concentrations of Cm and Am ions in both the salt phase and the organic phase. The results show that the ratio of concentrations (or $Kd$) between the organic phase and the salt phase for Cm is 1.4 while the ratio (or $Kd$) for Am is 0.43.

The process of this invention is adaptable to a countercurrent extraction procedure. It will be apparent that due to the exceptionally high separation factor this process may be limited to a minimum number of extraction stages. This is a particualr advantage since curium is available only in limited quantities which should not be excessively dispersed in processing solutions. Curium may be stripped from the organic phase by a conventional water wash.

The separation of curium and americium ions by the process of this invention has been accomplished with the metals in the form of chloride salts, but we prefer to use nitrate forms with nitrate fused salt baths.

The process of this invention may be used to purify curium contained as a mixture of americium and curium values in an organic phase, by preferentially extracting the americium into the molten salt phase.

It will be understood that this invention is not to be limited to the details given herein but that it may be modified as set forth in the appended claims.

What is claimed is:

1. A process of separating curium and americium values, comprising contacting at about 150° C. an anhydrous molten salt medium having a melting point below about 150° C. and an alkyl phosphate medium, said latter medium being a less than 0.2 M solution of alkyl phosphate in an organic diluent that is liquid at about 150° C. and resistant to oxidation and radiation, at least one of said mediums containing the curium and americium values in solution, whereby said curium values are preferentially held by said alkyl phosphate medium while said americium values are preferentially held by said molten salt medium, and separating an alkyl phosphate phase from a molten salt phase.

2. The process of claim 1 wherein the alkyl phosphate is tributyl phosphate.

3. The process of claim 1 wherein the anhydrous molten salt medium is selected from the group consisting of potassium nitrate, sodium nitrate, lithium nitrate, barium nitrate and mixtures thereof.

4. The process of claim 1 wherein the anhydrous molten salt medium is lithium nitrate-potassium nitrate eutectic.

5. A process of separating curium and americium values from an anhydrous molten salt bath at 150° C., comprising contacting said salt bath with a solution containing tributyl phosphate in a concentration of less than 0.2 M in a diluent liquid at about 150° C. and resistant to oxidation and radiation, whereby curium is preferentially extracted into an organic extract phase while americium preferentially remains in the molten salt bath, and separating the organic phase from the molten salt bath.

6. A process for separating curium and americium values contained in a first organic phase containing more than ten percent tributyl phosphate, comprising diluting said first organic phase with inert organic diluent to form a second organic phase containing tributyl phosphate in a concentration of less than 0.2 M, said diluent being liquid at about 150° C. and resistant to oxidation and radiation, contacting said second organic phase with an anhydrous molten salt bath at about 150° C. whereby americium is preferentially extracted into the salt bath while curium preferentially remains in the second organic phase, and separating the second organic phase from the molten salt bath.

7. A process of separating curium and americium values from an anhydrous molten salt bath consisting of a $LiNO_3$—$KNO_3$ eutectic comprising contacting said salt bath with an organic solvent consisting of an inert organic diluent 0.06 molar in tributyl phosphate, said diluent consisting of by weight 25 percent biphenyl, 55 percent ortho-terphenyl, and 20 percent meta-terphenyl at a temperature of about 150° C. whereby curium having a distribution coefficient between the salt bath and the organic solvent of about 0.48 is preferentially extracted into the organic solvent while americium having a distribution coefficient between the salt bath and the organic solvent of about 0.12 preferentially remains in the molten salt bath thereby providing a separation factor of about 4.0, and separating the organic solvent from the molten salt bath.

References Cited in the file of this patent

J. Inorg. and Nuclear Chem. 12, 136–140 (1959) December. (Copy in P.O.S.L.)